(12) United States Patent
Afek et al.

(10) Patent No.: US 11,899,798 B2
(45) Date of Patent: *Feb. 13, 2024

(54) SYSTEM AND METHOD FOR VERIFYING A REGEX SANITIZER AND A VALIDATOR

(71) Applicant: HCL TECHNOLOGIES LIMITED, Hertzelia (IL)

(72) Inventors: Jonathan Afek, Kfar Saba (IL); Gal Ben-Yair, Givaat Shmuel (IL)

(73) Assignee: HCL TECHNOLOGIES LIMITED, Hertzelia (IL)

( * ) Notice: Subject to any disclaimer, the term of this patent is extended or adjusted under 35 U.S.C. 154(b) by 421 days.

This patent is subject to a terminal disclaimer.

(21) Appl. No.: 16/870,019

(22) Filed: May 8, 2020

(65) Prior Publication Data

US 2021/0350005 A1 Nov. 11, 2021

(51) Int. Cl.
  *G06F 21/57* (2013.01)
  *G06F 11/36* (2006.01)

(52) U.S. Cl.
  CPC ........ *G06F 21/577* (2013.01); *G06F 11/3668* (2013.01); *G06F 2221/033* (2013.01)

(58) Field of Classification Search
  CPC .............. G06F 21/577; G06F 11/3668; G06F 2221/033
  See application file for complete search history.

(56) References Cited

U.S. PATENT DOCUMENTS

| | | | |
|---|---|---|---|
| 8,769,696 B2 | 7/2014 | Pistoia et al. | |
| 9,390,269 B2 | 7/2016 | Beskrovny et al. | |
| 2012/0131668 A1* | 5/2012 | Berg | G06F 8/75 726/22 |
| 2012/0167209 A1* | 6/2012 | Molnar | G06F 21/56 726/22 |
| 2014/0237602 A1* | 8/2014 | Guarnieri | G06F 21/577 726/25 |
| 2014/0325239 A1* | 10/2014 | Ghose | H04L 9/3247 713/190 |
| 2015/0095893 A1 | 4/2015 | Tripp et al. | |

FOREIGN PATENT DOCUMENTS

| | | |
|---|---|---|
| JP | 2016530587 A | 9/2016 |
| WO | 2014078585 A2 | 5/2014 |

* cited by examiner

*Primary Examiner* — Noura Zoubair (57) ABSTRACT

Disclosed is a method and system for verifying a regex sanitizer and a validator. The method comprises verifying of at least one of a regex sanitizer and a validator by applying the regex sanitizer and a validator over multiple predefined tainted inputs. An output obtained after applying at least one of the regex sanitizer is checked for one of a tainted output or a non-tainted output. The at least one of the regex sanitizer and validator may be qualified as a valid regex sanitizer and validator based upon the checking. The valid regex sanitizer may be tagged with a validation signature. The valid regex sanitizer is used for checking the tainted input in the user's input.

4 Claims, 8 Drawing Sheets

SYSTEM AND METHOD FOR VERIFYING A REGEX SANITIZER AND A VALIDATOR

CROSS-REFERENCE TO RELATED APPLICATIONS AND PRIORITY

The present application does not claim priority from any patent application.

TECHNICAL FIELD

The present subject matter described herein, in general, relates to data sanitizers and validators, and more particularly to a system method for verifying a regex sanitizer and a validator for an application testing process.

BACKGROUND

Data received by a software component from a source outside the component's trust boundary may be malicious and may also result in an injection attack. Programmer must take steps to ensure that data received across a trust boundary is appropriate and not malicious. In an exemplary scenario, when an attacker targets a web site, the attacker often attempts to inject data in an attempt to damage the website or gain internal information. Such injections to the web site may be easily parsed through server-side code and, as a result, the website may get corrupted and unintended behaviour may also occur.

In order to avoid such a scenario, it's important to ensure that input data received from a user is properly sanitized before use. In order to check that the data input is not malicious, an input validator and sanitizer have been widely used so far. To protect against such attacks, web site developers may try to sanitize and/or validate incoming input from the user to ensure that no malicious input exists.

A common method of validating tainted input and sanitizing is by using Regular Expression (regex) to check whether string received as the data input contains tainted characters, in which case an error message is outputted, or whether there are no tainted characters, in which case the code executes normally. However, the method of sanitization and validation is generally flawed so that when the website developer passes the tainted input through at least one regex validator and sanitizer, the input may be assumed to be not tainted but that is not always the case.

SUMMARY

Before the present system and method for verifying at least one of a Regular Expression (regex) sanitizer and a validator for application testing process are described, it is to be understood that this application is not limited to the particular systems, and methodologies described, as there can be multiple possible embodiments which are not expressly illustrated in the present disclosures. It is also to be understood that the terminology used in the description is for the purpose of describing the particular implementations or versions or embodiments only and is not intended to limit the scope of the present application.

This summary is provided to introduce aspects related to a system and a method for verifying at least one of a regex sanitizer and a validator. This summary is not intended to identify essential features of the claimed verifying the at least one of sanitizer and the validator. The subject matter nor is it intended for use in determining or limiting the scope of the claimed subject matter.

In one implementation, a system of verifying at least one of a regex sanitizer and a validator in an application testing process is disclosed. In one aspect, the system comprises a memory, and a processor coupled to the memory. Further, the processor may be capable of executing instructions in the memory to perform one or more steps described now. The processor may process a regex sanitizer and/or validator. The regex sanitizer and validator are configured for checking taint in a user's input. The processor may verify at least one regex sanitizer and validator before checking for the tainted input through the regex sanitizer. Further, the processor may apply at least one regex sanitizer and the validator over multiple predefined tainted strings associated with a previously checked input received from the user, during the verification. The processor may check, if an output obtained after applying the at least one of the regex sanitizer and the validator is one of a tainted output or a non-tainted output. Further, the processor may qualify the at least one of the regex sanitizer and the validator to be at least one of a valid regex sanitizer and a valid validator based on the checking Further the processor may tag, each of the at least one of the valid regex sanitizer and the valid validator with a validation signature. During the tagging, the at least one of the valid regex sanitizer is used for checking the tainted input in the user's input.

In another implementation, a method of verifying at least one of a regex sanitizer and a validator in an application testing process is disclosed. In one aspect, at least one of a regex sanitizer and a validator, t configured for checking a tainted input in a user's input are processed by a processor. Further verification of at least one of the regex sanitizer and the validator is done through the processor, before checking for the tainted input through the regex sanitizer. Verification of the at least one of the regex sanitizer and the validator comprises of, applying the at least one of the regex sanitizer and the validator over multiple predefined tainted strings associated with a previously checked input received from the user. Further the output obtained after applying the at least one of the regex sanitizer and the validator is checked if an output obtained one of a tainted output or a non-tainted output. At least one regex sanitizer and the validator are qualified to be at least one of a valid regex sanitizer and a valid validator based upon the checking. Further each of the at least one of the valid regex sanitizer and the validator is tagged with a validation signature. The at least one of the valid regex sanitizer and the valid validator is used for checking the tainted input in the user's input.

BRIEF DESCRIPTION OF THE DRAWINGS

The foregoing detailed description of embodiments is better understood when read in conjunction with the appended drawings. For the purpose of illustrating of the present subject matter, an example of construction of the present subject matter is provided as figures; however, the invention is not limited to the specific method and system disclosed in the document and the figures.

The present subject matter is described in detail with reference to the accompanying figures. In the figures, the left-most digit(s) of a reference number identifies the figure in which the reference number first appears. The same numbers are used throughout the drawings to refer various features of the present subject matter.

DETAILED DESCRIPTION

Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any systems and methods for verifying a regex sanitizer and a validator, similar or equivalent to those described herein can be used in the practice or testing of embodiments of the present disclosure, the exemplary, verifying a regex sanitizer and a validator are now described. The disclosed embodiments verifying a regex sanitizer and a validator are merely examples of the disclosure, which may be embodied in various forms.

Various modifications to the embodiment will be readily apparent to those skilled in the art and the generic principles herein may be applied to other embodiments for verifying a Regular Expression (regex) sanitizer and validator. However, one of ordinary skill in the art will readily recognize that the present disclosure for verifying a regex sanitizer and a validator is not intended to be limited to the embodiments described, but is to be accorded the widest scope consistent with the principles and features described herein.

Generally, a vulnerability in the code occurs when server reads a user input from source and proceeds to using the code by sending the code to a sink. If the code developer passes a tainted input through a regex sanitizer, the input is assumed to be sanitized by the developer, however, the input so passed may not be a sanitized input. The tainted input refers to strings, headers, cookies or any input that an attacker may use to try to attack a web site. The input is assumed to be sanitized and validated by the developer; however, the input may not be a sanitized input. Conventional systems may detect that the regex sanitizer was called on a tainted source. However, the proposed system and the method suggest a way to verify that the sanitizer and the validator has actually worked.

The present subject matter overcomes a problem of a faulty output, The faulty output refers to an output that may not be a sanitized output or a validated output. The present system verifies at least one of a regex sanitizers and validator so as to define the at least one of the regex sanitizer and validator to be at least one of a verified regex sanitizer and a valid validator of at least one of a non-verified regex sanitizer and a non-verified validator.

Figure 1:
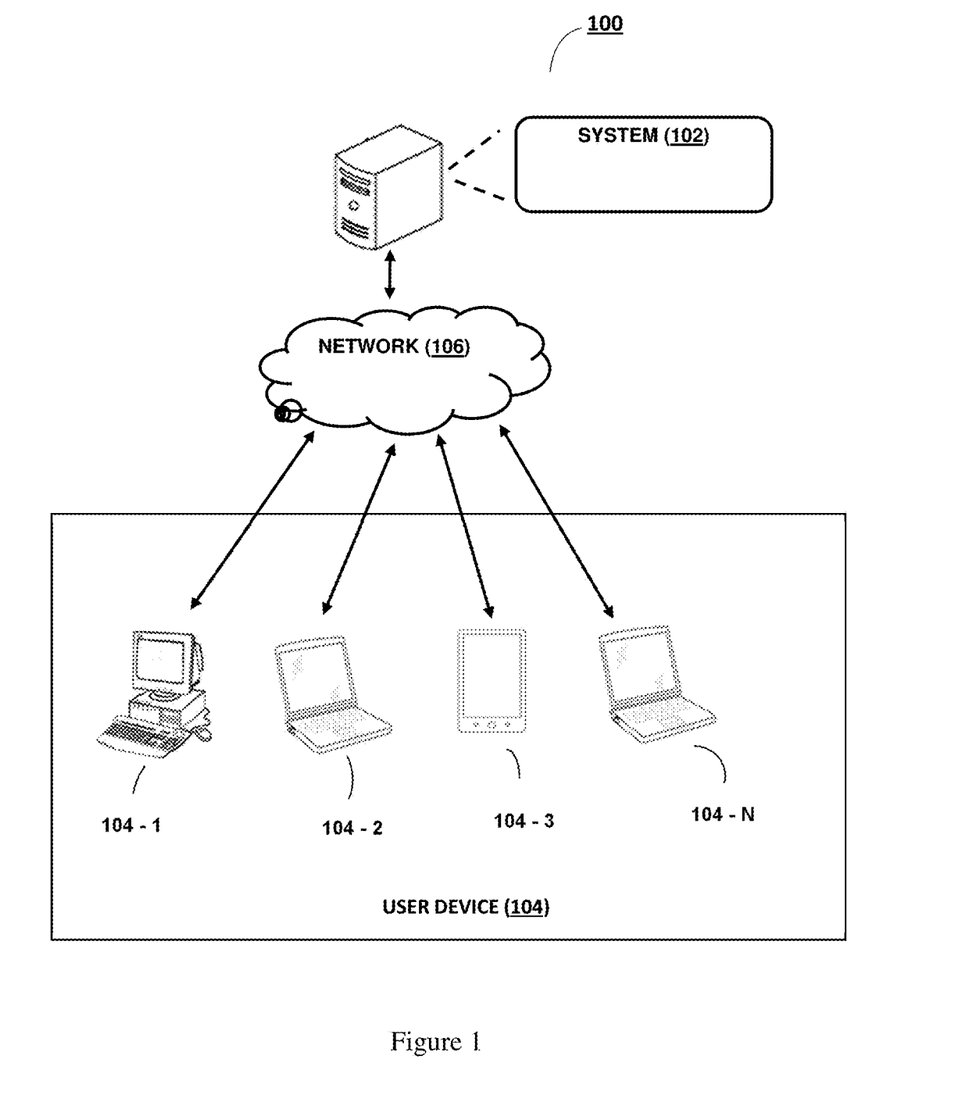
FIG. 1 illustrates a system architecture diagram 100 of a system 102 for verifying at least one of a Regular Expression (regex) sanitizer and a validator, in accordance with an embodiment of the present subject matter.

Referring now to FIG. 1, a system architecture diagram 100 of a system 102 for verifying at least one of a regex sanitizers and a validator, in accordance with an embodiment of the present subject matter may be described. In one example, the system 102 may be connected with mobile devices 104-1 through 104-N (collectively referred as 104) through a communication network 106.

It should be understood that the system 102 and the mobile devices 104 correspond to computing devices. It may be understood that the system 102 may also be implemented in a variety of computing systems, such as a laptop computer, a desktop computer, a notebook, a workstation, a mainframe computer, a server, a network server, a cloud-based computing environment, or a smart phone and the like. It may be understood that the mobile devices 104 may correspond to a variety of a variety of portable computing devices, such as a laptop computer, a desktop computer, a notebook, a smart phone, a tablet, a phablet, and the like.

In one implementation, the communication network 106 may be a wireless network, a wired network, or a combination thereof. The communication network 106 can be implemented as one of the different types of networks, such as intranet, Local Area Network (LAN), Wireless Personal Area Network (WPAN), Wireless Local Area Network (WLAN), wide area network (WAN), the internet, and the like. The communication network 106 may either be a dedicated network or a shared network. The shared network represents an association of the different types of networks that use a variety of protocols, for example, MQ Telemetry Transport (MQTT), Extensible Messaging and Presence Protocol (XMPP), Hypertext Transfer Protocol (HTTP), Transmission Control Protocol/Internet Protocol (TCP/IP), Wireless Application Protocol (WAP), and the like, to communicate with one another. Further, the communication network 106 may include a variety of network devices, including routers, bridges, servers, computing devices, storage devices, and the like.

Figure 2:
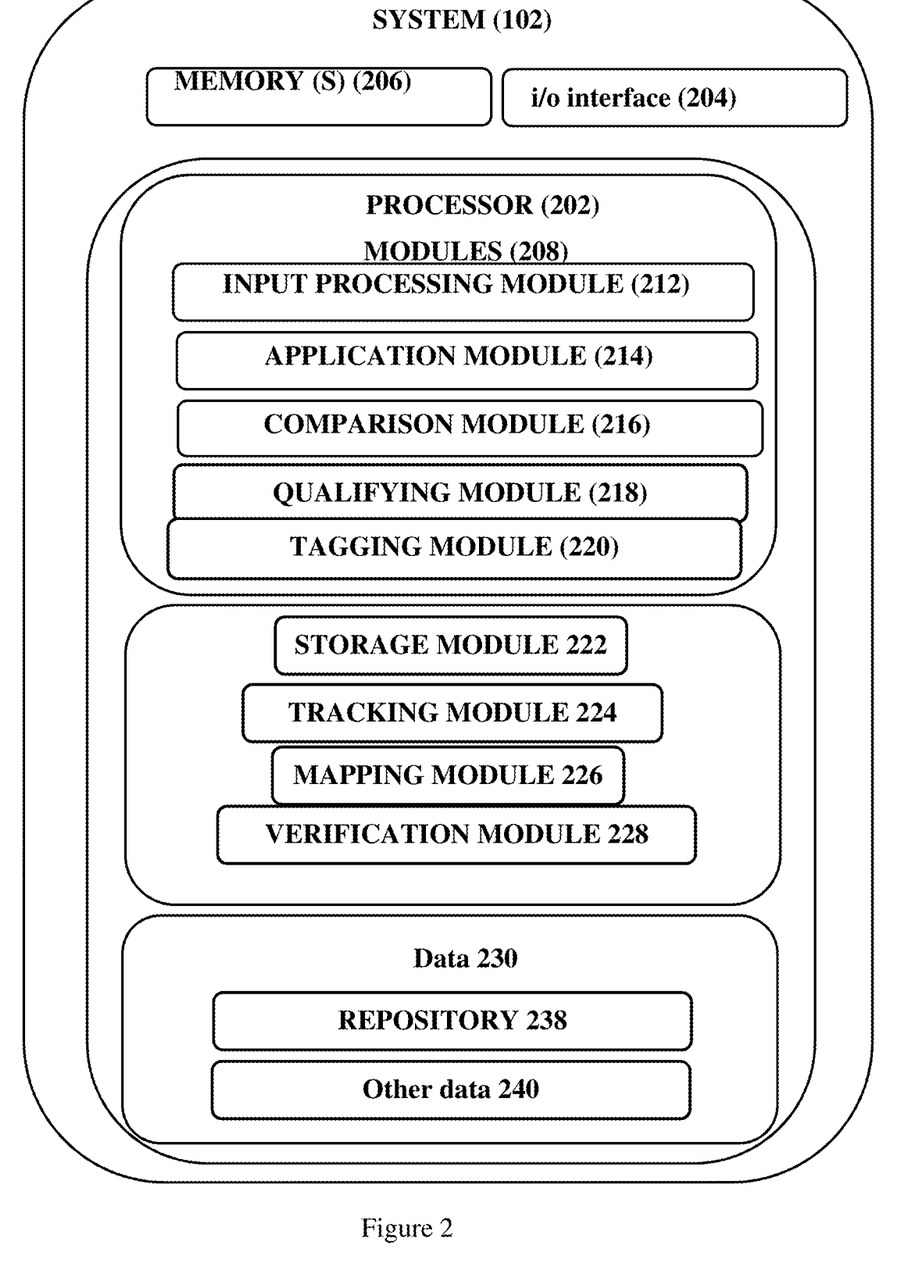
FIG. 2 illustrates a block level diagram of the system 102, in accordance with an embodiment of the present subject matter.

Referring now to FIG. 2, a block diagram 200 of the system 102 is illustrated in accordance with an embodiment of the present subject matter. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 may be configured to fetch and execute computer-readable instructions stored in the memory 206.

The I/O interface 204 may include a variety of software and hardware interfaces, for example, a web interface, a graphical user interface, a command line interface, and the like. The I/O interface 204 may allow a user to interact with the system 102. Further, the I/O interface 204 may enable the system 102 to communicate with the mobile devices 104, and other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206, amongst other things, serves as a repository for storing data processed, received, and generated by one or more of modules 208. The memory 206 may include any computer-readable medium or computer program product known in the art including, for example, volatile memory, such as Static Random Access Memory (SRAM) and Dynamic Random Access Memory (DRAM), and/or non-volatile memory, such as Read Only Memory (ROM), Erasable Programmable ROM (EPROM), Electrically Erasable and Programmable ROM (EEPROM), flash memories, hard disks, optical disks, and magnetic tapes.

The memory 206 may include data generated as a result of the execution of one or more of the modules 208. The memory 206 is connected to a plurality of modules 208. The system 102 comprises an input processing module 212, an application module 214, a comparison module 216, a qualifying module 218 and a tagging module 220. The system 202 may also comprise of a storage module 222, a tracking module 224, a mapping module 226 and a verification module 228.

The data 230 may include a repository 238 for storing data processed, computed, received, and generated by one or more of the modules 208. Furthermore, the data 210 may include other data 240 for storing data generated as a result of the execution of modules than the ones mentioned above.

In one implementation, to verify at least one of a regex sanitizer and a validator in an application testing process, the processor 202 may process the at least one regex sanitizer and validator. The processor 202 may verify the at least one of the regex sanitizers and the validator before checking for the tainted input through the regex sanitizer.

A tainted string in an application are strings used by an attacker for attacking the web site. Attackers may attack the web site by using the many types of vulnerabilities known today such as XSS or SQL injections. During the verification, the at least one of the regex sanitizers and the validator are applied over multiple predefined tainted strings associated with a previously checked input received from the user.

Multiple predefined tainted strings are used for this testing. For example, the multiple predefined string may look like: string: "/</script/>/<svg/onload=alert(1) width=100//>"). The processor 202 then checks in case the output obtained after applying the regex sanitizer is one of a tainted output or a non-tainted output. If the output is similar to an original string or the string that was altered but not sufficiently (for example "/</script/>/") then the sanitation has failed. If the string was properly changed or escaped, the sanitation is approved. For example, the string as referred above must be changed to ""/</script/>/<svg/ onload=alert(1) width=100//>"" to pass validation and to declare the regex sanitizer as the valid sanitizer.

Based upon the checking, the processor 202 may qualify the at least one of the regex sanitizer and the validator as at least one of the valid regex sanitizer and a valid validator. If in case the output obtained is non tainted output, the at least one of the regex sanitizer and the validator is qualified as at least one of the valid regex sanitizer and the validator. In case the output obtained is a tainted output, the at least one of the regex sanitizer and the validator are qualified as at least one of an invalid regex sanitizer and an invalid validator.

Upon checking, the processor 202 further tags each of the valid regex sanitizer and the valid validator with a validation signature. The valid regex sanitizer and validator is used for checking the tainted input in the user's input. The validation signature is defined according to each of the regex sanitizer, an actual regex of the regex sanitizer, a code path followed by the regex sanitizer and the vulnerability type being sanitized. For example, the regex "|< >|" for SQL injection will have a different signature from that of regex "|< >|" for XSS.

In one embodiment, the at least one of the regex sanitizer and the validator comprise one of a verified sanitizer and a validator or a non-verified sanitizer and a validator. The processor 202 may tag each of the regex sanitizer and the validator with a signature during a first-time processing. For each subsequent processing of a next at least one of a regex sanitizer and a validator after the first time processing, the processor 202 first checks in case the next at least one of the regex sanitizer and the validator already have a verified signature and has already been verified as one of the verified regex sanitizer and the validator or the non-verified regex sanitizer and the validator.

In one embodiment, the memory 206 may store each of the at least one of the valid regex sanitizers and the validator along with the valid signature as a previously verified at least one of the valid regex sanitizers and the validator. The processor 202 further may keep a track, if the new regex sanitizer needs to be verified is associated with the valid signature. The processor 202 may map the signature associated with the new regex sanitizer and validator with the valid signature. The processor 202 may verify the new regex sanitizer as the valid regex sanitizer based on a successful mapping of the signature with the valid signature.

In an example embodiment, A GET request is received in a web server. The developer code extracts a parameter from the request. The developer attempts to sanitize the user input by replacing all instanced of the char "<" with the string "<". The agent code detects the replacement attempt and tried to send a tainted payload through the regex sanitizer using the same regex used by the developer. The agent succeeds in passing the tainted payload and so invalidates the regex sanitizer and declares the regex sanitizer as the non-valid regex sanitizer.

Figure 3A:
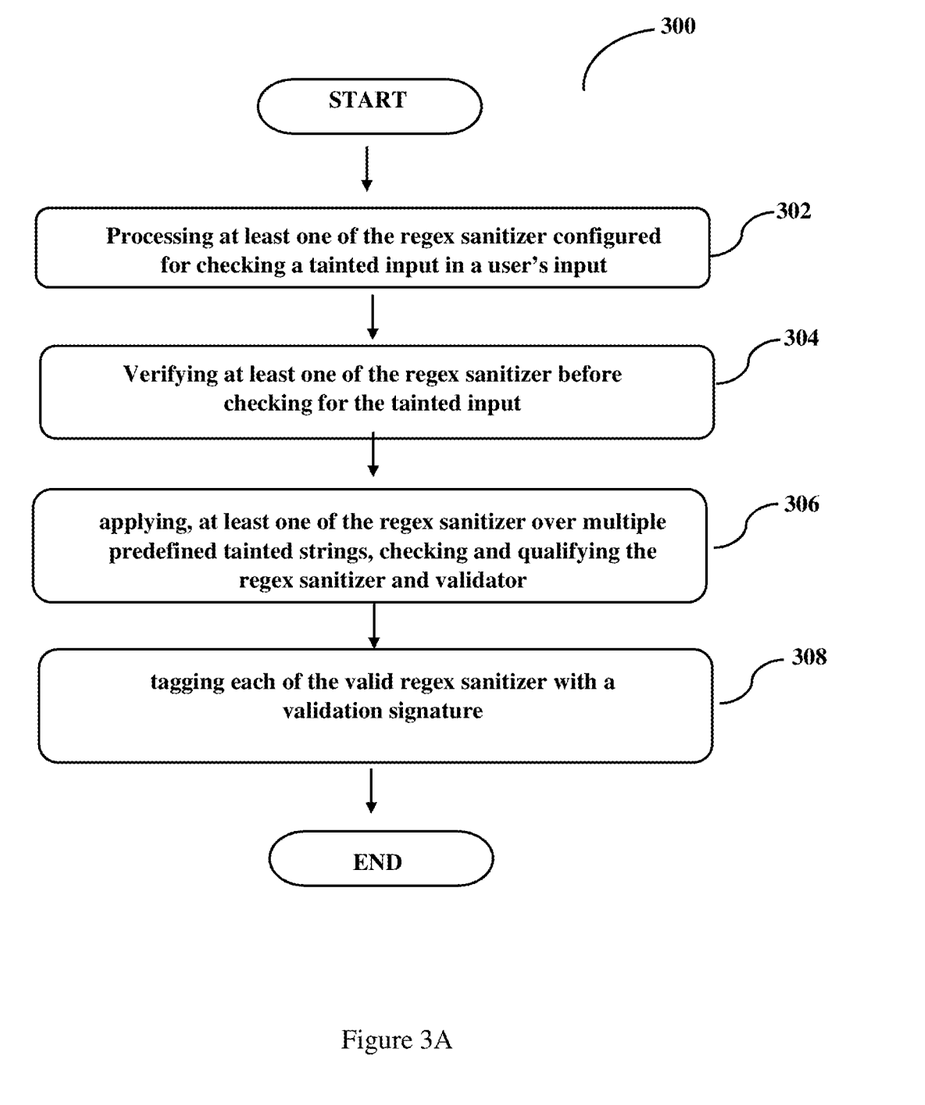
FIG. 3A illustrates a method 300 for verifying at least one of the regex sanitizer and a validator, in accordance with an embodiment of the present subject matter.

Referring now to FIG. 3, a method 300 to verify at least one of a regex sanitizer and a validator is described, in accordance with an embodiment of the present subject matter. The method 300 may be described in the general context of computer executable instructions. Generally, computer executable instructions can include routines, programs, objects, components, data structures, procedures, modules, functions, etc., that perform particular functions or implement particular abstract data types.

The order in which the method 300 to verify at least one of a regex sanitizer and validator is described is not intended to be construed as a limitation, and any number of the described method blocks can be combined in any order to implement the method 300 or alternate methods. Additionally, individual blocks may be deleted from the method 300 without departing from the spirit and scope of the subject matter described herein. Furthermore, the method can be implemented in any suitable hardware, software, firmware, or combination thereof. However, for ease of explanation, in the embodiments described below, the method 300 may be considered to be implemented in the above described system 102.

At block 302, at least one the regex sanitizer and/the validator are first processed by a processor 202 for checking a tainted input in a user's input At block 304, at least one of the regex sanitizer and the validator are verified by the processor 202 before checking for the tainted input. If the at least one of the regex sanitizer and the validator is a verified sanitizer and a verified validator, then the verified regex sanitizer and the verified validator are not processed and verified again. If the at least one of the regex sanitizer and the validator is at least one of a non-verified regex Sanitizer and non-verified validator, the at least one of the regex sanitizer and the validator are verified further.

At block 306, at least one of the regex sanitizer and/ validator are applied by the application module 214 over multiple predefined tainted strings associated with a previously checked input received from the user. The output obtained is checked by the comparison module 216 after applying the regex sanitizer if is the output is one of a tainted output or a non-tainted output. At least one of the regex sanitizer and the validator may be qualified by the qualifying module 218 as at least one of the verified regex sanitizer and the verified validator in case of a non-tainted output and as at least one of the non-verified regex sanitizer and the non-verified validator in case of a tainted output.

At block 308, at least one of the valid regex sanitizer and the validator is tagged with a validation signature by the tagging module 220. The valid regex sanitizer is further used for checking the tainted input in the user's input.

Figure 3B:
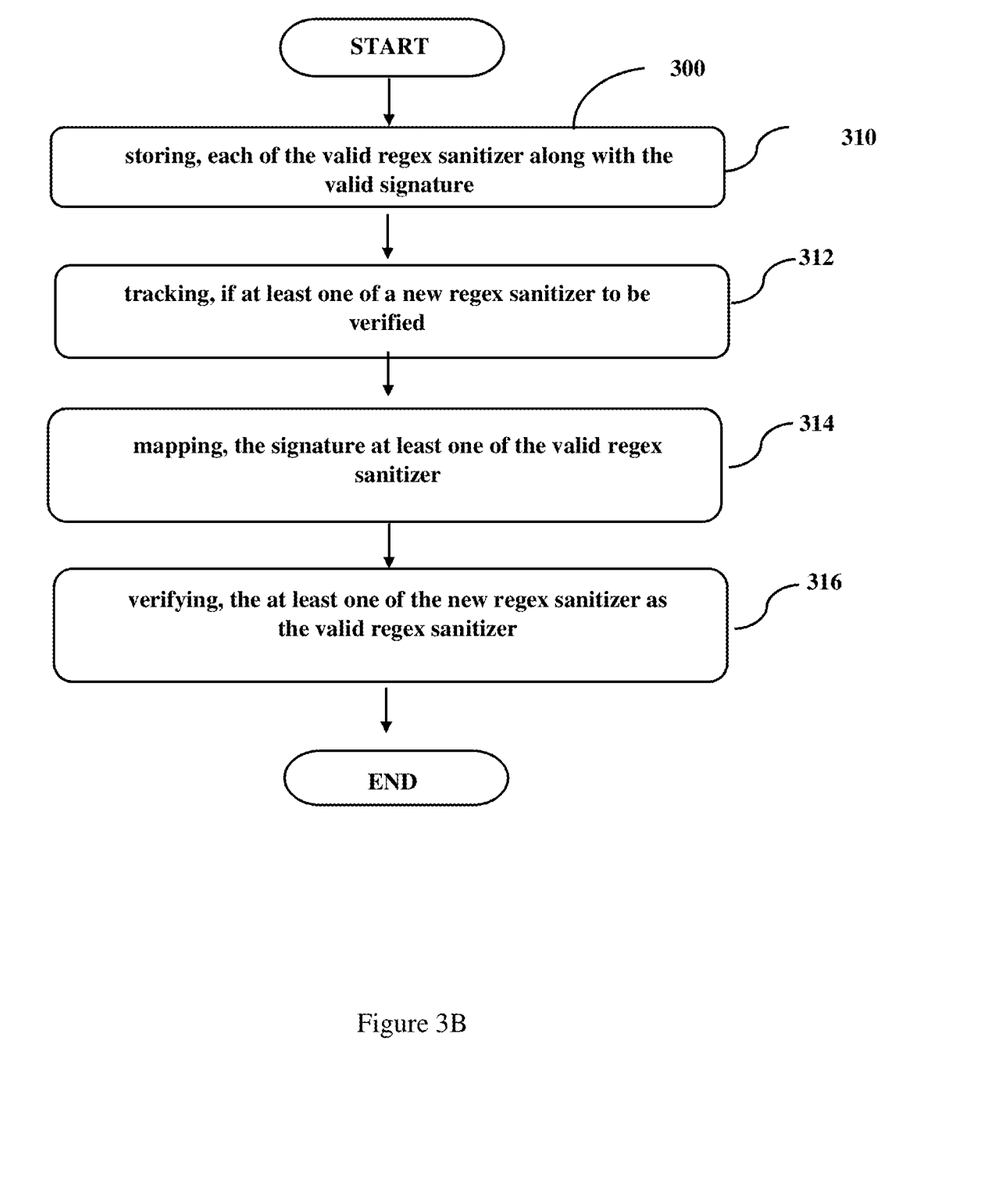
FIG. 3B illustrates an embodiment of a method 300 for verifying at least one of the regex sanitizer and a validator, in accordance with an embodiment of the present subject matter.

In an embodiment, the method 300 to verify the at least one of the regex sanitizer and the validator may comprise:

At block 310, each of the at least one of the valid regex sanitizer and the validator along with the valid signature may be stored in the storage module 222 as the previously verified valid regex sanitizer and validator. In case of a previously verified regex sanitizer and validator, the system 102 may only check the signature and may not process it further as it is a verified valid regex sanitizer and validator.

At block 312, the processor 202 tracks through the tracking module 224, in case a new regex sanitizer to be verified is having a signature.

At block 314, the processor 202 maps through the mapping module 226 for the signature for at least one of the valid regex sanitizer and the validator to check if the at least one of the regex sanitizer and the validator is associated with a signature.

At block 316, at least one of the new regex sanitizer and validator may be verified by the processor 202 through the verification module 228 as the valid regex sanitizer based on the mapping of the signature with the valid signature.

Figure 4A:
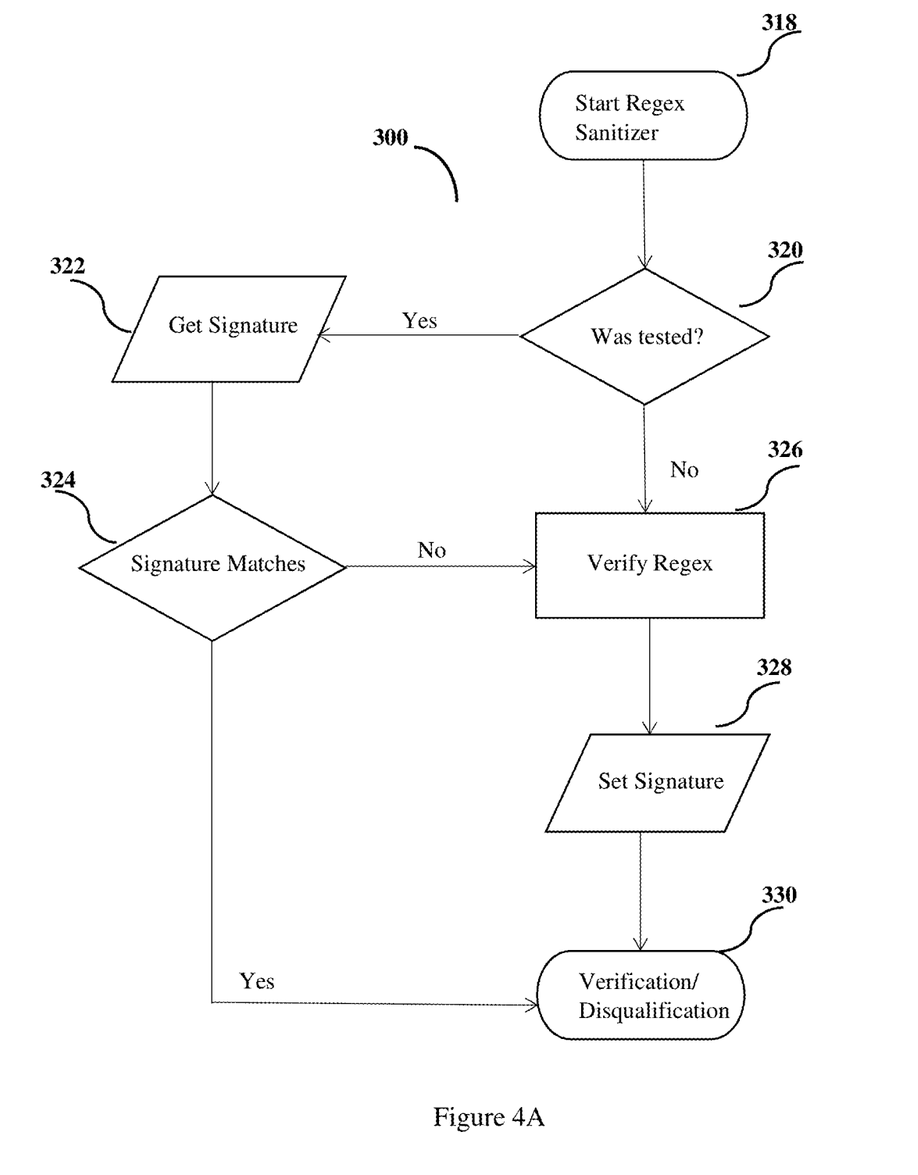
FIG. 4A illustrates a working flowchart of the method 300 for verifying at least one of the regex sanitizer and a validator, in accordance with an embodiment of the present subject matter.

Referring now to FIG. 4A, an example embodiment of additional details of the method 300 providing verification of the at least one of the regex sanitizer is described.

In an example implementation, at step 318, the at least one of the regex sanitizer is processed by the processor 202.

In step 320, further the processor 202 checks whether the at least one of the regex Sanitizer is a verified regex sanitizer or the non-verified sanitizer and the non-verified validator.

In step 322, the valid signature stored in the memory 206 is fetched by the processor 202 for checking in case the at least one of the regex sanitizer is at least one of the verified regex sanitizer.

In step 324, the processor 202 compares the valid signature (pre-stored in the memory 206) with the signature associated with the at least one of the regex sanitizer, and checks for a match of the signature with the signature associated with the at least one of the regex sanitizer. Based on the check, the at least one of the regex sanitizer is not processed further in case the signature is not matched. The at least one of the regex sanitizer and the validator directly gets verified in case the signature is matched as shown in step 328.

In step 326, if in case the signature of the at least one of the regex sanitizer does not match, the at least one of the regex sanitizer is further verified as discussed above. The at least one of the regex sanitizer is applied by the application module 214 over multiple predefined tainted strings associated with a previously checked input received from the user. After applying the at least one of the regex sanitizer the output obtained is checked by the comparison module 216 to be received as one of a tainted output or a non-tainted output. The at least one of the regex sanitizer may be qualified by the qualifying module 218 as at least one of the verified regex sanitizer in case of the non-tainted output and as at least one of the non-verified regex sanitizer in case of the tainted output.

In step 328, the valid regex sanitizer is tagged with a validation signature by the tagging module 220.

Figure 4B:
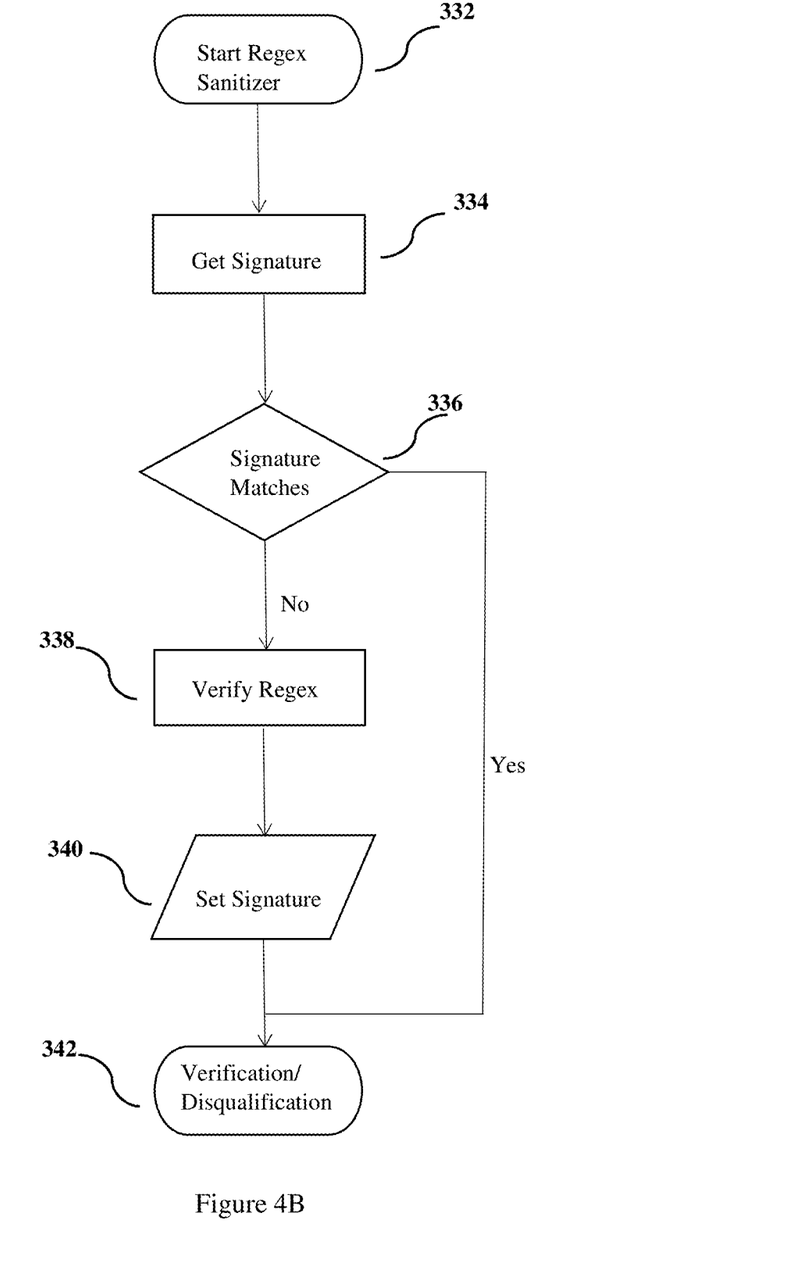
FIG. 4B illustrates a working flowchart of the method 300 for verifying at least one of the regex sanitizer and a validator, in accordance with an embodiment of the present subject matter.

In step 330, based on the signature mapping, the at least one of the regex sanitizer is verified as at least one of the valid regex sanitizer or at least one of the disqualified regex sanitizer Referring now to FIG. 4B, an example embodiment of method 300 providing verification of at least one of the regex validator is described, in accordance with an embodiment of the present subject matter.

In an example implementation, at step 332 the verification of the at least one of the regex validator is started. Firstly, the processor 202 processes the regex validator.

In step 334, further the processor 202 checks whether the regex validator is the verified regex validator or the non-verified regex sanitizer and validator. In order to check for the verified regex validator, the stored signature is fetched by the processor 202.

In step 336, the processor 202 compares the signature with the at least one of regex validator if in case the signature of the regex validator matches, then the regex validator is not processed further and directly gets verified as one of the valid regex validator or a disqualified regex validator in step 342.

In step 338, if in case the signature of at least one of the regex validators does not match, the regex validator is further verified. At least one of the regex validator is applied by the application module 214 over multiple predefined tainted strings associated with a previously checked input received from the user. The output obtained is checked by the comparison module 216 after applying at least one of the regex validators is one of a tainted output or a non-tainted output. At least one of the regex validators may be qualified by the qualifying module 218 as a verified regex sanitizer in case of a non-tainted output and as a non-verified regex validator in case of a tainted output.

In step 340, at least one of the valid regex validator is tagged with a validation signature by the tagging module.

In step 342, the regex validator is verified as a valid or disqualified regex validator.

Figure 5A:
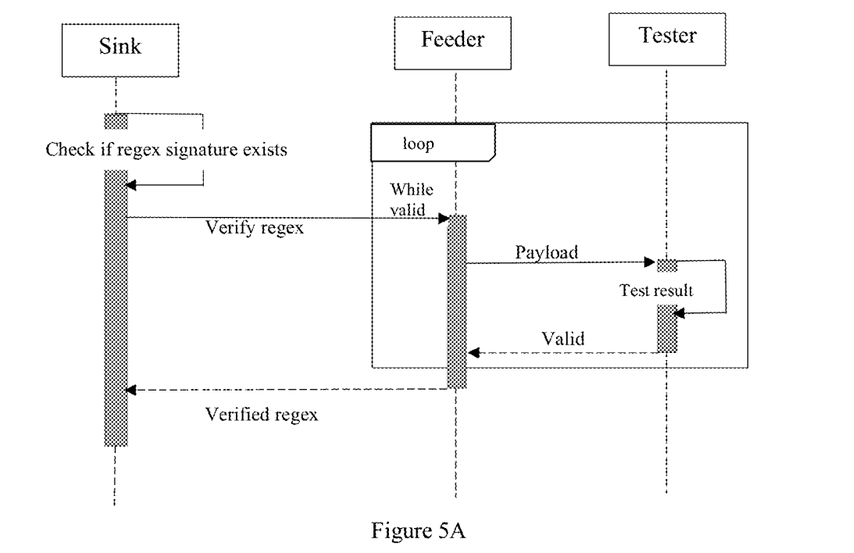
FIG. 5A, illustrates an example embodiment of first instance of a good regex sanitizer and validator for the method 300 for verifying the at least one of the regex sanitizer and the validator, in accordance with an embodiment of the present subject matter.

Referring now to FIG. 5A, an example embodiment illustrating the first occurrence of a good sanitizer or validator is described. When a code is passed from a source to the sink, the system 102 verifies the regex sanitizer and validator. The processor 202 checks, whether a signature associated with at least one of the regex sanitizer and validator exists or not. If in case the signature exists, the at least one of the regex sanitizer and validator is verified as the valid regex sanitizer and validator. If in case the signature does not match, the processor 202 verifies the at least one of the regex sanitizer and the validator at a feeder level. In the verification, the at least one of the regex sanitizer and the validator are applied over multiple tainted inputs (payloads as shown in FIG. 5A).

The output obtained after applying the regex sanitizer is further checked to determine if the output is one of a tainted output or a non-tainted output. The at least one of the regex sanitizers and validator are qualified as a valid sanitizer and validator as the output obtained is a non-tainted output based upon the checking at the tester level which generates the test results. Each of the valid regex sanitizer is tagged with a validation signature. The validation signature is further used to determine whether the regex sanitizer and validator has been verified as a valid sanitizer and validator.

Figure 5B:
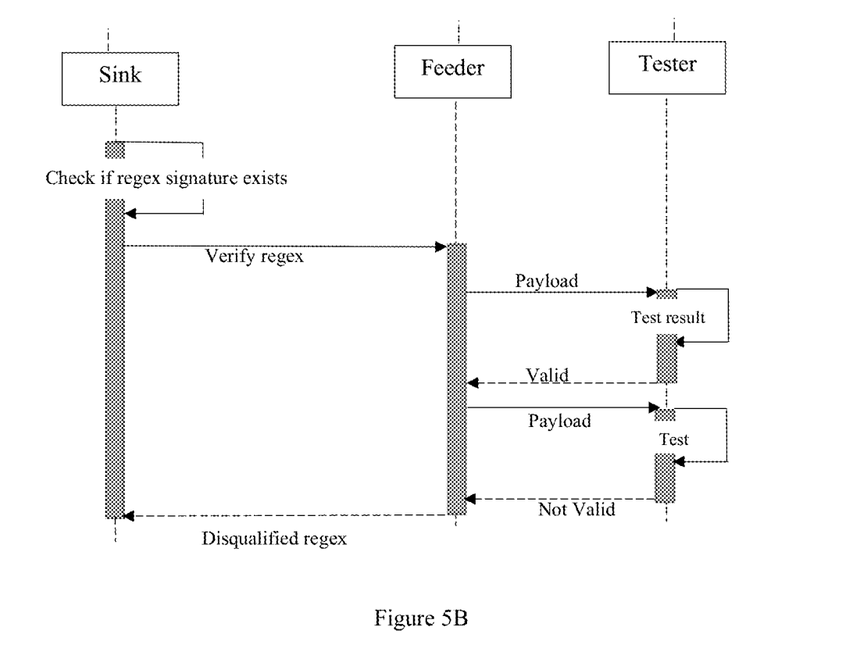
FIG. 5B, illustrates an example embodiment of first instance of a bad sanitizer and validator for the method 300 for verifying the at least one of the regex sanitizer and the validator, in accordance with an embodiment of the present subject matter.

Referring now to FIG. 5B, an example embodiment illustrating the first occurrence of a bad sanitizer or validator is described. When a code is passed from a source to the sink, the system 102 verifies at least one of the regex sanitizer and validator. The processor 202 checks, whether a signature associated with the at least one of the regex sanitizer and validator exists or not. If in case a signature exists, the at least one of the regex sanitizer and validator is verified as a valid regex sanitizer and validator. If in case the signature does not match, the processor 202 verifies the at least one of the regex sanitizer and validator at the feeder level. In the verification, the at least one of the regex sanitizer and validator is applied over multiple tainted inputs (payloads as shown in figure). The output obtained after applying the regex sanitizer is further checked to determine the output is one of a tainted output or a non-tainted output. The at least one of the regex sanitizer and validator is qualified as an invalid sanitizer and validator as the output obtained is a tainted output based upon the checking at the tester level and generates the test results. Each of the invalid regex sanitizer is tagged with a validation signature. This validation signature is further used to determine whether the regex sanitizer and validator has been verified as an invalid sanitizer and validator.

Figure 5C:
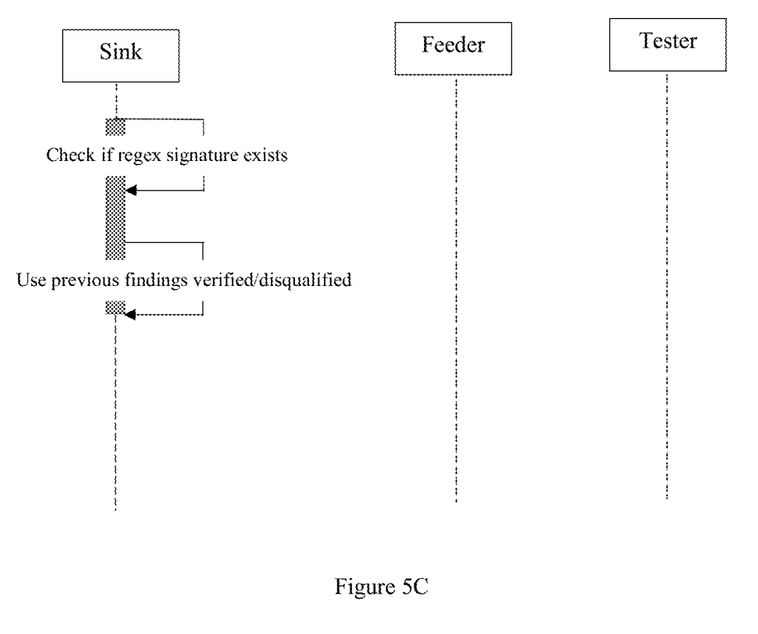
FIG. 5C, illustrates an example embodiment of $N^{th}$ instance of a good or bad sanitizer and validator for the method 300 for verifying the at least one of the regex sanitizer and the validator, in accordance with an embodiment of the present subject matter.

Referring now to FIG. 5C, an example embodiment illustrating an $N^{th}$ occurrence of a good or bad sanitizer and validator is described. When a code is passed to the sink, the system 102 verifies the at least one of the regex sanitizer and validator. The processor 202 checks, whether a signature associated with the sanitizer and validator exists or not. If in case a signature exists, the at least one of the regex sanitizer and validator is verified as a valid regex sanitizer and validator or an invalid regex sanitizer and validator.

The system and method to verify a regex sanitizer and validator provides with the attack string that results in a successful attack allows the customer to quickly and easily understand and resolve the issue. The present system and method to verify a regex sanitizer and validator reports a verified vulnerability thereby saving the time of the customer on supposed issues.

Although implementations for system and method for verifying a regex sanitizer and validator have been described in language specific to structural features and/or methods, it is to be understood that the appended claims are not necessarily limited to the specific features or methods described. Rather, the specific features and methods are disclosed as examples of implementations for verifying a regex sanitizer and validator.

The invention claimed is:

1. A method of verifying at least one of a Regular Expression (regex) sanitizer and a validator in an application testing process, the method comprising:
   processing, through a hardware processor, the at least one of the regex sanitizer and the validator configured for checking a tainted input in a user's input;
   verifying, through the hardware processor, the at least one of the regex sanitizer and validator before checking for the tainted input through the at least one of the regex sanitizer and the validator, wherein the verifying comprises:
   applying, the at least one of the regex sanitizer and the validator over multiple predefined tainted strings associated with a previously checked input received from the user;
   checking, if an output obtained after applying the at least one of the regex sanitizer and the validator is one of a tainted output or a non-tainted output;
   qualifying, the at least one of the regex sanitizer and the validator to be at least one of a valid regex sanitizer and a valid validator based on the checking; and
   tagging each of the valid regex sanitizer and the valid validator with a validation signature, wherein the at least one of the valid regex sanitizer and the valid validator is used for checking the tainted input in the user's input;
   storing each of the valid regex sanitizer and validator along with the validation signature as a previously verified valid regex sanitizer and validator, wherein the validation signature is defined according to each of the regex sanitizer and validator, a regex of the regex sanitizer and validator, a code path followed by the regex sanitizer and validator and the vulnerability type being sanitized;
   tracking, if at least one of a new regex sanitizer and validator to be verified is associated with a signature;
   matching the validation signature of the at least one of the valid regex sanitizer and validator with the signature associated with the at least one of the new regex sanitizer and validator to be verified in response to the tracking; and
   in response to the matching of the validation signature with the signature associated with the at least one of the new regex sanitizer and validator being successful, verifying the at least one of the new regex sanitizer and validator directly as the valid regex sanitizer and validator.

2. The method as claimed in claim 1, wherein the at least one of the regex sanitizer and validator comprises one of a verified sanitizer and validator or a non-verified sanitizer and validator.

3. A system of verifying at least one of a Regular Expression (regex) sanitizer and validator in an application testing process, the system comprising:
   a processor; and a memory coupled to the processor, wherein the memory stores a set of instructions to be executed by the processor, and wherein the processor is configured to:
process, at least one of a regex sanitizer and validator configured for checking a tainted input in a user's input;
verify, the at least one of the regex sanitizer and validator before checking for the tainted input through the regex sanitizer and validator, wherein the verifying comprises:
   apply, the at least one of the regex sanitizer and validator over multiple predefined tainted strings associated with a previously checked input received from the user;
   check, if an output obtained after applying the at least one of the regex sanitizer and validator is one of a tainted output or a non-tainted output;
   qualify, the at least one of the regex sanitizer and validator to be a valid regex sanitizer and validator based on the checking; and
   tag, each of the valid regex sanitizer and validator with a validation signature, wherein the at least one of the valid regex sanitizer and validator is used for checking the tainted input in the user's input;
store each of the valid regex sanitizer and validator along with the validation signature as a previously verified valid regex sanitizer and validator, wherein the validation signature is defined according to each of the regex sanitizer and validator, a regex of the regex sanitizer and validator, a code path followed by the regex sanitizer and validator and the vulnerability type being sanitized;
track, if at least one of a new regex sanitizer and validator to be verified is associated with a signature;
match the validation signature of the at least one of the valid regex sanitizer and validator with the signature associated with the at least one of the new regex sanitizer and validator to be verified in response to the tracking; and
in response to the match of the validation signature with the signature associated with the at least one of the new regex sanitizer and validator being successful, verify the at least one of the new regex sanitizer and validator directly as the valid regex sanitizer and validator.

4. The system as claimed in claim 3, wherein the at least one of the regex sanitizer and validator comprises one of a verified sanitizer and validators or a non-verified sanitizer and validator.

\* \* \* \* \*